May 5, 1936.  D. STENHOUSE  2,039,853

METHOD OF AND APPARATUS FOR MELTING GLASS BY ELECTRICITY

Filed Oct. 3, 1933  2 Sheets-Sheet 2

Inventor
David Stenhouse

By Ecleston & Ecleston
Attorneys

Patented May 5, 1936

2,039,853

UNITED STATES PATENT OFFICE 2,039,853

METHOD OF AND APPARATUS FOR MELTING GLASS BY ELECTRICITY

David Stenhouse, Washington, Pa., assignor to Hazel-Atlas Glass Company, Wheeling, W. Va., a corporation of West Virginia Application October 3, 1933, Serial No. 692,047

2 Claims. (Cl. 13—6)

The invention relates to the melting of glass batches, and particularly to a novel method and apparatus for melting glass by electricity, in which the glass is periodically ruptured at a series of points along the furnace thereby causing the formation of electric arcs at the points of separation. The apparatus employed preferably includes a revolving or oscillating furnace, but it is not essential for the invention relates broadly to rupturing the glass and causing electric arcs to pass at the points of separation. Obviously a revolving or oscillating furnace is not essential in carrying out such a method.

The melting of glass by electricity is old and well known, and it is also common knowledge that molten glass is a conductor of electricity. In accordance with the present invention the molten glass periodically acts as a conductor, and during these periods the glass is caused to draw apart at various parts throughout the length of the furnace, resulting in a series of arcs between the separating masses of glass.

The invention will be clearly understood by those skilled in the art, from the following detailed description when taken in connection with the accompanying drawings illustrating one form of apparatus for carrying out the novel method.

Figure 1:
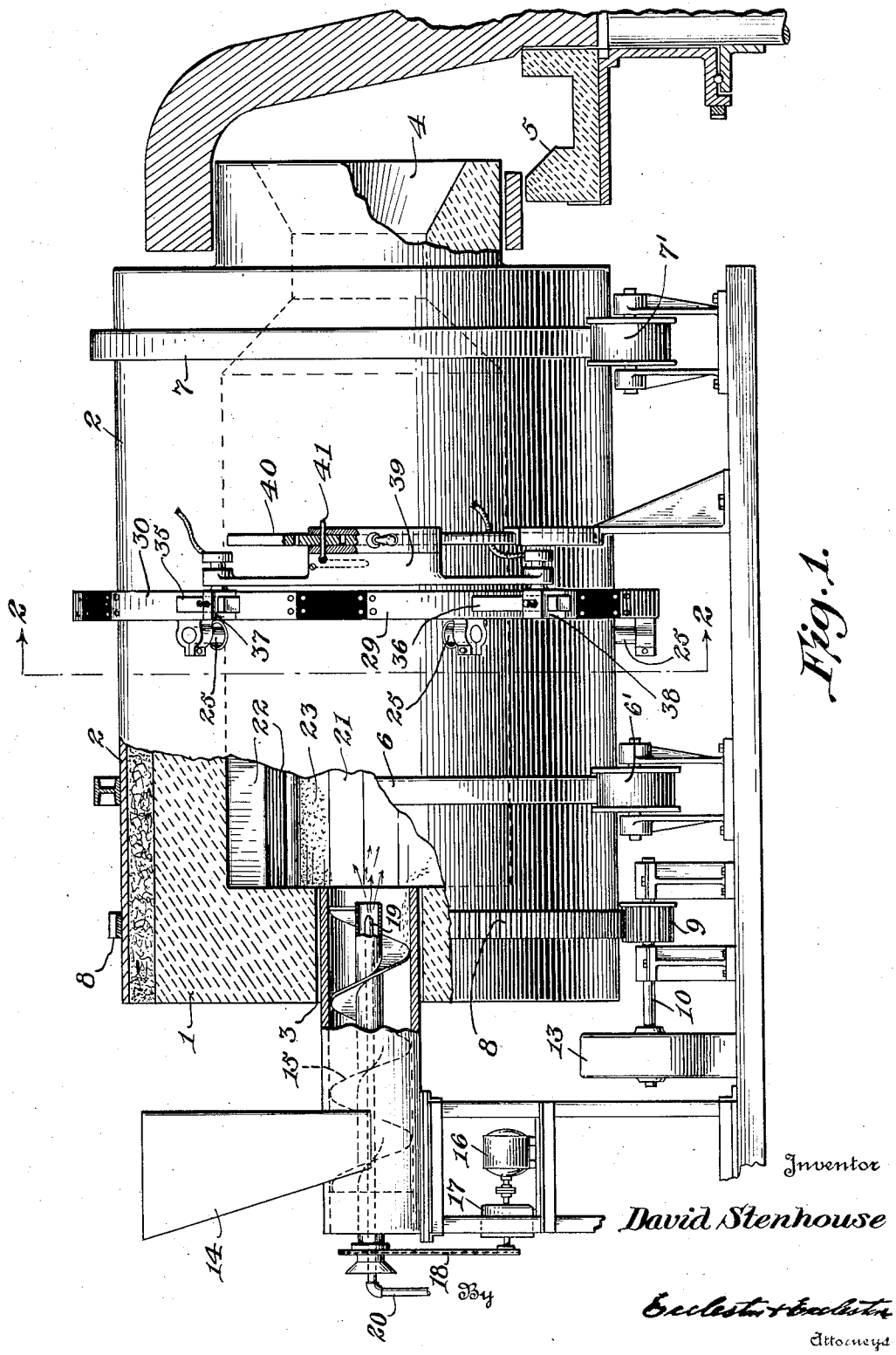
Figure 1 is a side elevational view of the apparatus; parts being broken away.

Referring to the drawings in more detail, numeral 1 refers to a rotating tank or furnace, which is preferably enclosed in the metallic casing 2. The furnace is provided with a charging opening 3 through which the batch is fed, and a discharge opening 4 through which the melted and refined glass is delivered. The present invention is not concerned with the disposal of the glass when it leaves the furnace, and merely for purposes of illustration a revolving pot 5 is shown as receiving the glass from the furnace.

Circling the casing 2 are bands 6 and 7 which are revolvably supported upon rollers 6' and 7'. In the specific form illustrated the furnace is continuously rotated, though of course it may be oscillated if preferred. A ring gear 8 is secured to the casing 2, and a pinion 9 carried by shaft 10 meshes with the ring gear. The shaft 10 is driven by a motor 11 through gear connections 12 to a gear reduction contained in the reduction case 13. Obviously any desired mechanism may be employed for either rotating or oscillating the furnace; and as stated hereinbefore it is not essential to the broad principle involved to employ either a rotating or an oscillating furnace.

Batch may be supplied to the furnace either intermittently or continuously by any desired means, though I prefer to employ the mechanism shown herein for continuously feeding the batch to the furnace. The batch is supplied to a hopper 14 from a source of supply (not shown), and a screw conveyer 15 delivers it to the interior of the furnace. The screw may be driven by any desired means, as by a motor 16 through a speed reduction gearing enclosed in the case 17 and sprocket chain 18. As will appear hereinafter electricity is not employed in the initial stage of melting the batch; recourse being had to a burner for first bringing the glass batch to a molten state, after which the electric means is put into operation and continued indefinitely. The specific construction shown herein for initially melting the batch includes a burner 19 which is inserted through the hollow shaft of the screw conveyer. The gas or other fuel under pressure is supplied to the burner 19 by a pipe 20, and sufficient air to support complete combustion is drawn in by the suction created; though if preferred the supply of air may be had from a source of compressed air, the rate of flow being controlled so as to give the desired type of flame.

After the initial melting of the batch by burners or otherwise, the electric means is thrown into operation to continue the melting indefinitely, batch being continuously or intermittently fed to the furnace during this continuous melting operation. The method and apparatus by which this electric melting is accomplished, will now be described.

The furnace lining is formed in part by refractory blocks or segments 21. Arranged at intervals between these liner blocks are similar refractory blocks 22, but these blocks 22 project farther inwardly than do the first-mentioned blocks, so that they extend into the glass at times during the rotation of the furnace. The blocks preferably extend the full length of the furnace, but it will be apparent that many different arrangements of the blocks are possible, and hence the particular arrangement shown herein is to be considered merely as illustrative. The rotation of the furnace in the direction of the arrow, causes each of the blocks 22 to successively lift the viscous molten glass above its normal level. As the rotation continues the glass on the projecting portion of the block will flow back to the mass of glass in the bottom of the tank. During this flow the glass will rupture and separate at many points, and at these points an electric arc will be caused to pass between the glass in the bottom of the tank and the glass cataracting from the projections.

One form of apparatus for causing the electric arcs to pass at the points where the glass is drawing apart during the continued rotation of the tank, will now be described. At intervals about the furnace are a number of blocks or segments 23, which preferably extend substantially the full length of the furnace. These blocks are electric conductors and are made of any suitable conducting material. The number and arrangement of the conductors may be varied as desired, but in the specific form illustrated there is a conductor above each of the refractory blocks 22, so that current will pass through the glass during its separation period, as shown at the right hand side of Figure 2.

Numeral 24 refers to a commutator band, to which are clamped a number of electrodes 25. Each electrode passes through an opening 26 and is intimately connected with its adjacent conductor 23. The openings are larger than the electrodes, and to further provide against electric contact with the casing 2, bushings 27 of non-conducting material are preferably inserted in the openings.

The commutator band 24 is supported in spaced relation from the furnace casing by a number of brackets 28 and these brackets are insulated from the commutator band by insulating material; and the commutator segments 29, 30, 31, 32, 33 and 34 being likewise insulated from each other. Numerals 35 and 36 refer to brushes adjustably mounted in the terminals 37 and 38 of the brush holder 39. This brush holder is preferably slidably mounted on an arm 40, and is held in adjusted position by a pin 41.

Only a brief description of the operation of the invention is necessary, in view of the foregoing detailed description of the particular form of apparatus disclosed. When the furnace is first put into operation the batch is preferably melted by means of a burner. For this purpose an ordinary burner is shown, but obviously any desired means may be employed for initially melting the batch; and if preferred it may be originally melted elsewhere and then be delivered to the rotating furnace. After the initial melting of the batch the electric means for continuing the melting indefinitely, is thrown into operation. During this continuous electric melting operation the batch is preferably continuously supplied to the furnace, by the means illustrated or by any other desired means; and the melted and refined glass is preferably delivered continuously from the other end of the furnace. If preferred, the batch may be fed intermittently, and whether the batch is fed continuously or intermittently the melted and refined glass may be delivered continuously or intermittently. Also, the invention is not limited to any particular apparatus for carrying out the novel method, and while a continuously rotating furnace is shown, and the method will be described in connection with a rotating furnace, yet it will be understood that an oscillating furnace may also be employed; and, in fact, the invention is not limited to either a rotating or oscillating furnace, for the broad method here involved may be carried out by widely different apparatus.

Figure 2:
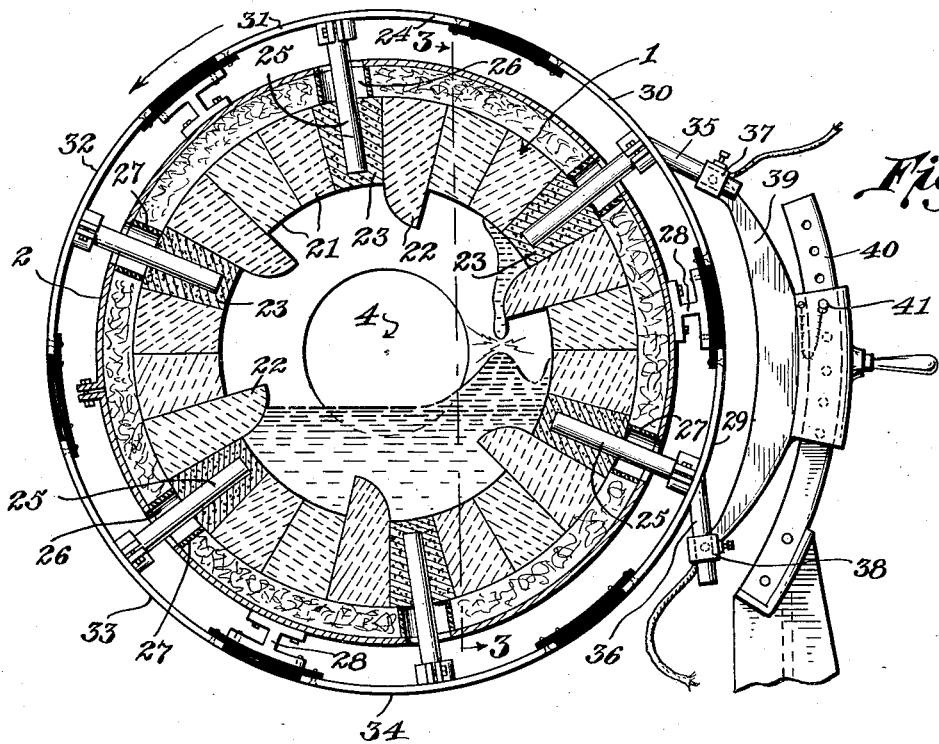
Figure 2 is a vertical transverse sectional view taken on line 2—2 of Figure 1.
Figure 3:
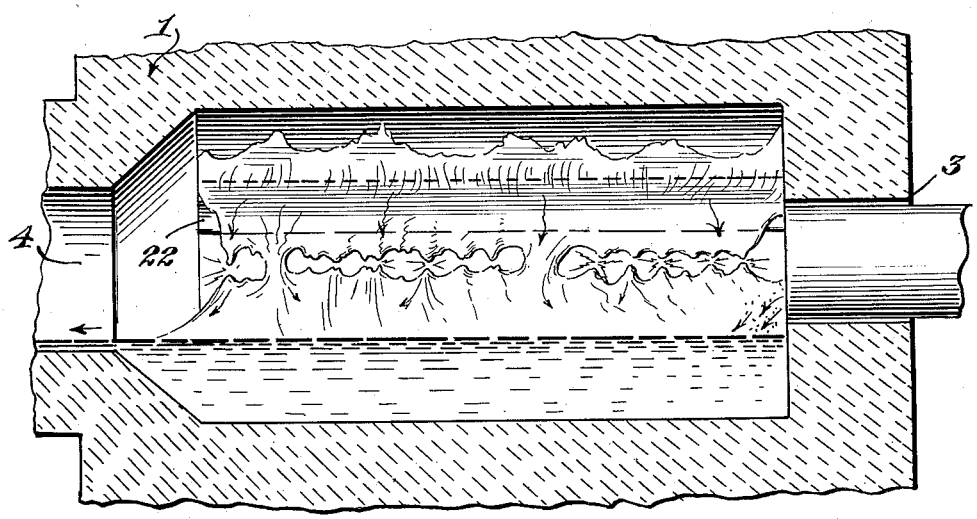
Figure 3 is a vertical longitudinal sectional view taken on line 3—3 of Figure 2.
Figure 4:
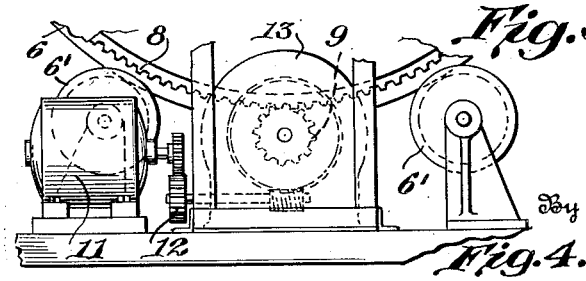
Figure 4 is a detail view of one form of driving mechanism for rotating the furnace.

The initial melting of the glass having been accomplished, the burner is shut off and the electric means is thrown into operation. The continuous operation of melting the batch by electricity, will be best understood by references to Figures 2 and 3. As the tank continuously revolves the inwardly extending blocks 22 will successively lift a portion of the glass above its normal level in the bottom of the tank. During the continued rotation of the tank the glass will start to flow back from the particular block to the body of glass, and eventually the flowing stream will rupture, as illustrated in Figures 2 and 3. This rupturing or separation of the glass will occur at many points, and at each of these points an electric arc will occur, so that arcs are occurring throughout the length of the furnace. And, of course, this occurs when each of the inwardly projecting blocks comes to a position where a separation takes place between the body of the glass and the portion lifted above the normal level. Thus a continuously melting of the batch is accomplished.

The invention is not limited to any particular means for conducting electricity to the glass during the rotation of the furnace, though I prefer the means shown and described hereinbefore. By reference to Figure 2 it will be noted that during the period when the glass is being lifted and separated the brushes 35 and 36 are in contact with commutator segments 30 and 29 so that a current of electricity will be set up through the electrodes 25 associated with these particular commutator segments, through the conductor blocks 23 associated with these electrodes, and through the molten glass. A current of electricity having been set up, arcs will occur when the glass is ruptured as described hereinbefore, and, of course, this rupturing of the glass occurs at various points throughout the length of the furnace. As the furnace continues to rotate the brushes 35 and 36 will pass from the commutator segments 30 and 29, respectively, and will pass onto the segments 29 and 34, respectively; and this will occur when the tank has been rotated to a position where the glass is flowing from the next succeeding block 22. This continues as long as the tank is in operation, current being caused to pass through the glass every time one of the blocks 22 reaches a point where the glass has been lifted by one of the blocks 22 and is flowing back to join the body of glass in the bottom of the tank. Thus the arcing occurs periodically during the continued rotation of the furnace, and throughout the length of the furnace.

Having fully described the invention what I claim is:

1. Apparatus for melting batch material in a body of molten glass including a furnace, means for rotating the furnace, a plurality of members projecting into the interior of the furnace for successively separating portions of molten glass from the main body of glass in the furnace, conductors arranged above and below each of the inwardly projecting members, and means for successively establishing a current between the conductors associated with each of said members, as each member successively becomes operative to separate portions of glass.

2. The method of continuously melting batch material in a body of molten glass in a moving tank, which consists in originally reducing a glass batch to a molten state, adding batch material to the molten glass, causing the molten glass to periodically become separated by movement of the tank, and establishing an electric arc between the separated portions.

DAVID STENHOUSE.